United States Patent
Liao

(10) Patent No.: US 8,812,139 B2
(45) Date of Patent: Aug. 19, 2014

(54) ELECTRONIC DEVICE CAPABLE OF AUTO-TRACKING SOUND SOURCE

(75) Inventor: Ming-Yang Liao, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 536 days.

(21) Appl. No.: 12/975,258

(22) Filed: Dec. 21, 2010

(65) Prior Publication Data

US 2012/0041580 A1     Feb. 16, 2012

(30) Foreign Application Priority Data

Aug. 10, 2010  (TW) ................................ 99126569 A

(51) Int. Cl.
*G06F 17/00*  (2006.01)
*H04M 1/725* (2006.01)
*H04M 1/02*  (2006.01)

(52) U.S. Cl.
CPC ........ H04M 1/72519 (2013.01); *H04M 1/0202* (2013.01)
USPC ............................................. 700/94; 381/92

(58) Field of Classification Search
CPC .. H04R 3/005; H04R 1/406; H04R 2201/401; H04R 2201/403
USPC ...................... 700/94; 381/92, 124
See application file for complete search history.

(56) References Cited

U.S. PATENT DOCUMENTS

| | | | | |
|---|---|---|---|---|
| 4,956,824 A | * | 9/1990 | Sindeband et al. | 367/129 |
| 5,664,021 A | * | 9/1997 | Chu et al. | 381/92 |
| 5,737,431 A | * | 4/1998 | Brandstein et al. | 381/92 |
| 5,778,082 A | * | 7/1998 | Chu et al. | 381/92 |
| 6,516,066 B2 | * | 2/2003 | Hayashi | 381/92 |
| 6,760,449 B1 | * | 7/2004 | Matsuo | 381/92 |
| 7,039,198 B2 | * | 5/2006 | Birchfield et al. | 381/92 |
| 7,039,199 B2 | * | 5/2006 | Rui | 381/92 |
| 7,158,645 B2 | * | 1/2007 | June et al. | 381/92 |
| 7,162,043 B2 | * | 1/2007 | Sugiyama et al. | 381/92 |
| 7,206,418 B2 | * | 4/2007 | Yang et al. | 381/92 |
| 7,283,850 B2 | * | 10/2007 | Granovetter et al. | 455/570 |
| 7,333,622 B2 | * | 2/2008 | Algazi et al. | 381/310 |
| 7,366,308 B1 | * | 4/2008 | Kock | 381/92 |
| 7,489,788 B2 | * | 2/2009 | Leung et al. | 381/92 |

(Continued)

FOREIGN PATENT DOCUMENTS

| | | | |
|---|---|---|---|
| EP | 1289247 A2 | * | 3/2003 |
| KR | 2006073291 A | * | 6/2006 |

*Primary Examiner* — Vivian Chin
*Assistant Examiner* — Leonard M Giannone
(74) *Attorney, Agent, or Firm* — Novak Druce Connolly Bove + Quigg LLP

(57) ABSTRACT

An electronic device capable of auto-tracking a sound source includes a driving member including a rotor, a housing fixed to the rotor; a first sound sensor positioned on the housing for detecting sound from the sound source to generate a first sound signal. A second sound sensor positioned on the housing spaced from the first sound sensor for detecting sound from the sound source to generate a second sound signal. A third sound sensor positioned on a perpendicular bisector of the connection line of the first sound sensor and the second sound sensor for detecting sound from the sound source to generate a third sound signal. A microphone positioned on a perpendicular bisector of the connection line of the first sound sensor and the second sound sensor, and a processor positioned in the housing for analyzing intensities of the three sound signals, and controlling the driving member to rotate.

8 Claims, 5 Drawing Sheets

(56) References Cited

U.S. PATENT DOCUMENTS

| | | | |
|---|---|---|---|
| 7,495,998 B1* | 2/2009 | Deligeorges et al. | 367/127 |
| 2001/0028719 A1* | 10/2001 | Hayashi | 381/92 |
| 2002/0009203 A1* | 1/2002 | Erten | 381/92 |
| 2002/0181721 A1* | 12/2002 | Sugiyama et al. | 381/92 |
| 2003/0072460 A1* | 4/2003 | Gonopolskiy et al. | 381/92 |
| 2003/0118200 A1* | 6/2003 | Beaucoup et al. | 381/110 |
| 2003/0133577 A1* | 7/2003 | Yoshida | 381/56 |
| 2003/0179890 A1* | 9/2003 | Matsuo | 381/92 |
| 2003/0185410 A1* | 10/2003 | June et al. | 381/94.1 |
| 2005/0008169 A1* | 1/2005 | Muren et al. | 381/92 |
| 2005/0060142 A1* | 3/2005 | Visser et al. | 704/201 |
| 2006/0018458 A1* | 1/2006 | McCree et al. | 379/406.01 |
| 2006/0245601 A1* | 11/2006 | Michaud et al. | 381/92 |
| 2007/0038444 A1* | 2/2007 | Buck et al. | 704/235 |
| 2007/0159924 A1* | 7/2007 | Vook et al. | 367/127 |
| 2008/0144876 A1* | 6/2008 | Reining et al. | 381/369 |
| 2008/0199025 A1* | 8/2008 | Amada | 381/92 |
| 2008/0267422 A1* | 10/2008 | Cox | 381/92 |
| 2008/0279391 A1* | 11/2008 | Yoshida | 381/92 |
| 2009/0086993 A1* | 4/2009 | Kawaguchi et al. | 381/92 |
| 2009/0310444 A1* | 12/2009 | Hiroe | 367/125 |
| 2009/0323474 A1* | 12/2009 | Lin | 367/118 |
| 2010/0188929 A1* | 7/2010 | Kitaura | 367/13 |

* cited by examiner

ELECTRONIC DEVICE CAPABLE OF AUTO-TRACKING SOUND SOURCE

BACKGROUND

1. Technical Field

The present disclosure relates to round-table conference technology and, particularly, to an electronic device capable of dynamically auto-tracking a sound source.

2. Description of Related Art

For communication from remote locations, a telephone conference is a convenient method. An electronic device used in the telephone conference provides audio information from participants. If the telephone conference is a round-table conference, the electronic device is preferably able to track active speakers during the conference. The most common way of doing this is by manual control of the electronic device. However, this is inconvenient in practice.

Therefore, it is desirable to provide an electronic device capable of auto-tracking a sound source, which can overcome or at least alleviate the above-mentioned problems.

DETAILED DESCRIPTION

Figure 1:
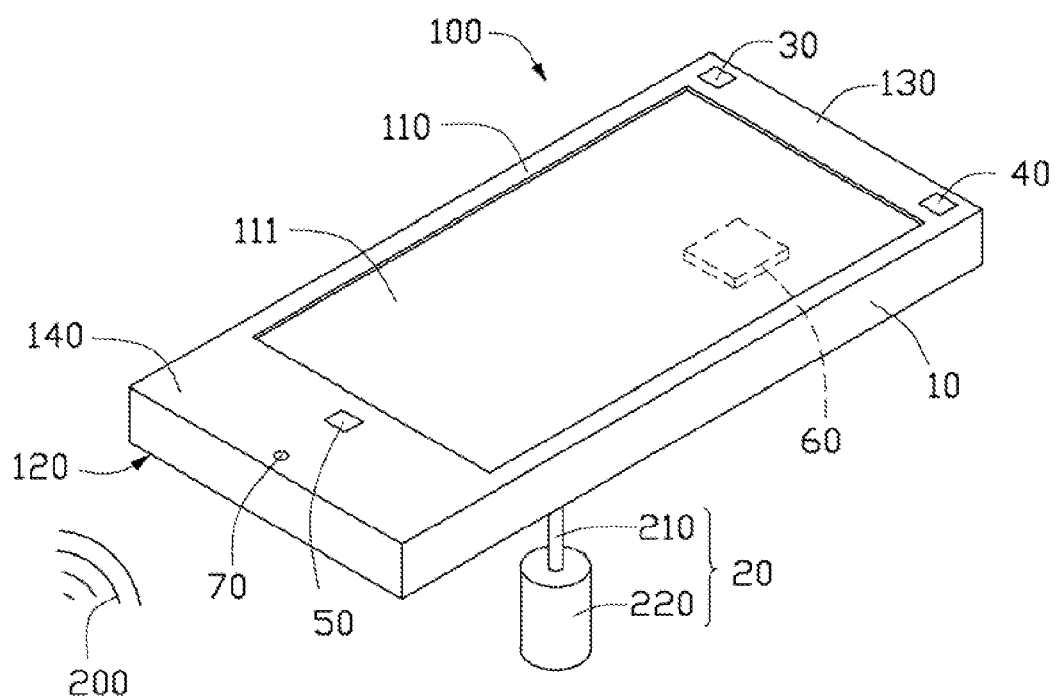
FIG. 1 is a schematic, isometric view of an electronic device, according to a first exemplary embodiment.
Figure 2:
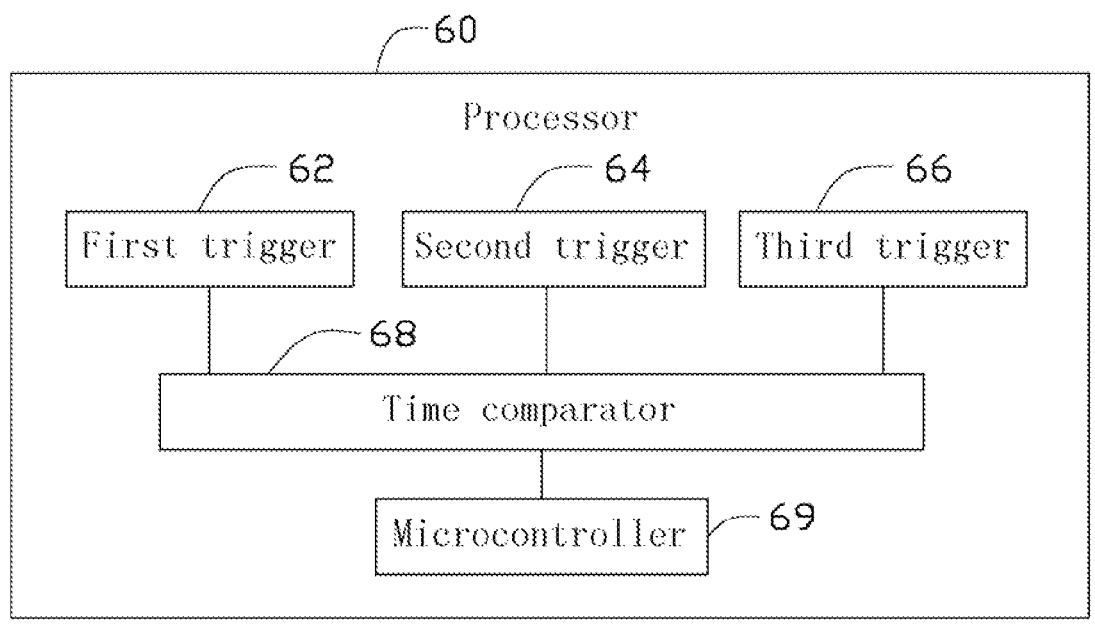
FIG. 2 is a functional block diagram of a processor of the electronic device of FIG. 1.
Figure 3:
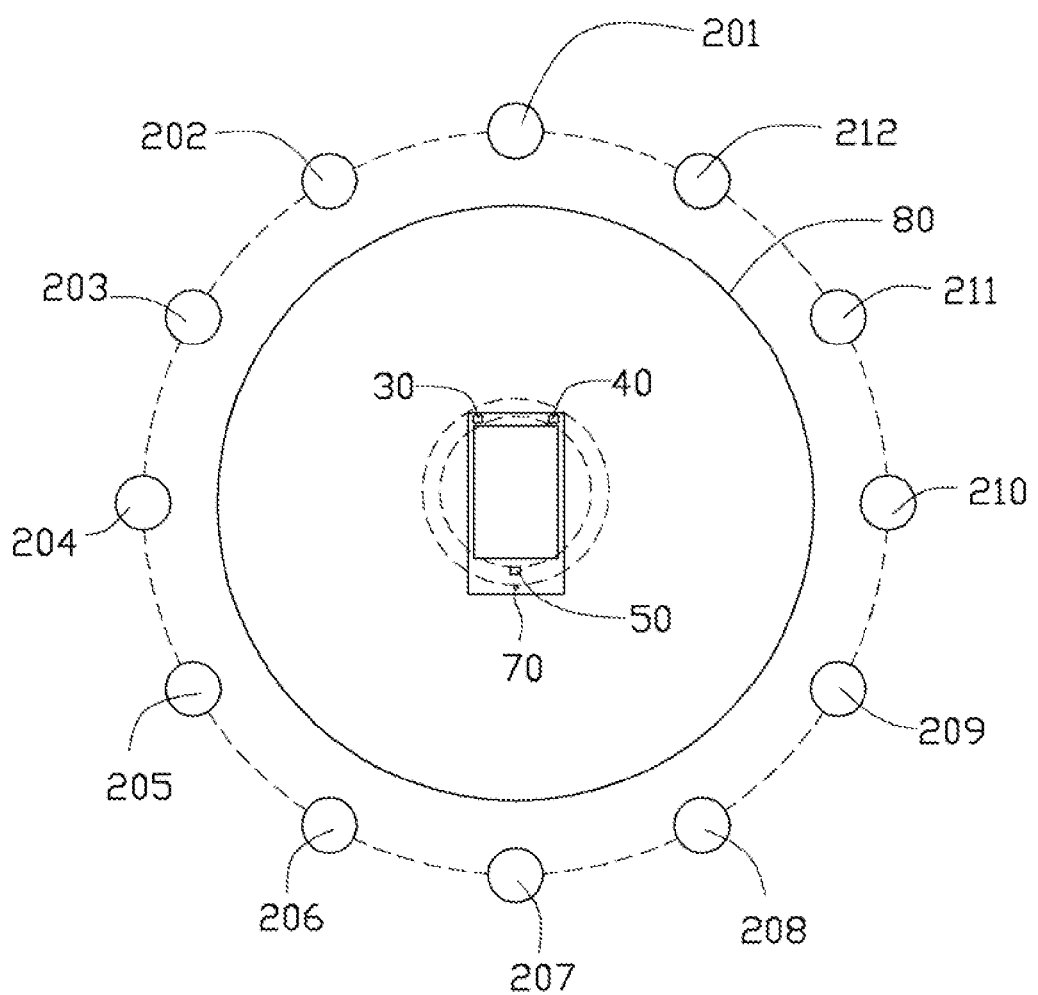
FIG. 3 is a planar view of the electronic device used in a round-table conference.

Referring to FIGS. 1-3, an electronic device 100, according to a first exemplary embodiment, includes a housing 10, a driving member 20, a first sound sensor 30, a second sound sensor 40, a third sound sensor 50, a processor 60, and a microphone 70. The electronic device 100 is used in a round-table telephone conference and may be a mobile phone, a personal digital assistant (PDA), or a digital camera. In this embodiment, the electronic device 100 is a mobile phone.

The housing 10 includes a first surface 110 and a second surface 120 opposite to the first surface 110. A screen 111 is formed on the first surface 110. The housing 10 is substantially a cube and includes a first end 130 and a second end 140. The first end 130 and the second end 140 are positioned at opposite sides of the housing 10.

The driving member 20 is a sever motor and includes a rotor 210 and a stator 220. The rotor 210 extends from the stator 220. The stator 220 is positioned on a round table 80. The rotor 210 is attached to the second surface 120 so that the rotor 210 supports the housing 10. A number of participants 201 to 212 (shown in FIG. 3) sit around the round table 80.

The first sound sensor 30 and the second sound sensor 40 are positioned on the first end 130 and are spaced from each other. The third sound sensor 50 is positioned on the second end 140. The microphone 70 is positioned on the housing 10. The third sound sensor 50 and the microphone 70 are arranged on a perpendicular bisector of the connection line of the first sound sensor 30 and the second sound sensor 40. The first sound sensor 30 is configured for detecting sound from a sound source 200 to generate a first sound signal associated with the sound. The second sound sensor 40 is configured for detecting sound from the sound source 200 to generate a second sound signal associated with the sound. The third sound sensor 50 is configured for detecting sound from the sound source 200 to generate a third sound signal associated with the sound. The microphone 70 is configured for receiving sound from the participants 201 to 212.

The intensity of the sound signal generated by the first sound sensor 30, the second sound sensor 40, or the third sound sensor 50 can be, for example, a time index representing a time of receipt of a sound generated from the sound source 200, such as a travel time (t1, t2 or t3) of the sound from the sound source 200 to the corresponding sound sensor. In other words, the intensity of the first sound signal is first travel time t1 of the sound from the sound source 200 to the first sound sensor 30. The intensity of the second sound signal is second travel time t2 of the sound from the sound source 200 to the second sound sensor 40. The intensity of the third sound signal is third travel time t3 of the sound from the sound source 200 to the third sound sensor 50. If the sound source 200 is substantially equidistant from the first sound sensor 30 and the second sound sensor 40, the first travel time t1 and the second travel time t2 are substantially the same in the time index. On the contrary, if the sound source 200 is located away from the perpendicular bisector of the connection line of the first sound sensor 30 and the second sound sensor 40, the first travel time t1 and the second travel time t2 are different.

The processor 60 is configured for analyzing the first travel time t1, the second travel time t2, and the third travel time t3, and controlling the driving member 20 to rotate along a direction in which the third travel time t3 decreases, according a difference between the first travel time t1 and the second travel time t2, thereby moving the microphone 70 toward the sound source 200. In detail, the processor 60 is embedded in the housing 10 and includes a first trigger 62, a second trigger 64, a third trigger 66, a time comparator 68, and a microcontroller 69. The three triggers 62, 64, and 66 are electrically connected to the three sound sensors 30, 40, and 50 respectively and are electrically connected to the time comparator 68. The microcontroller 69 is electrically connected to the time comparator 68 and the driving member 20. The three triggers 62, 64, and 66 are configured for outputting pulse signals to the time comparator 68 in response to the first, second or third sound signals. The time comparator 68 is configured for comparing the first travel time t1, the second travel time t2, and the third travel time t3, and calculating the difference between the first travel time t1 and the second travel time t2. The microcontroller 69 is configured for controlling the driving member 20 to rotate along the direction in which the third travel time t3 decreases, according to the travel time difference.

When the electronic device 100 is in operation during a telephone conference, the three sound sensors 30, 40, and 50 respectively generate the three sound signals. The time comparator 68 compares the three travel time t1, t2, and t3 and calculates the difference between the first travel time t1 and the second travel time t2. If the difference (t1−t2) is substantially equal to zero and the third travel time t3 satisfies the following formula: t3<t1=t2, the microphone 70 aims at the sound source 200 and the microcontroller 69 will not control the driving member 20 to rotate. If the difference (t1−t2) is substantially equal to zero and the third travel time t3 satisfies the following formula: t3>t1=t2, the microcontroller 69 will control the driving member 20 to rotate along the direction in which the third travel time t3 decreases until the difference (t1−t2) is substantially equal to zero. For example, when the participant 201 speaks, if the difference (t1−t2) is substantially equal to zero and the third travel time t3 satisfies the following formula: t3<t1=t2, the driving member 20 will not rotate. When the participant 207 speaks, if the difference (t1−t2) is substantially equal to zero and the third travel time t3 satisfies the following formula: t3>t1=t2, the driving member 20 will rotate clockwise or counter-clockwise in the direction which the third travel time t3 decreases until the difference (t1−t2) is substantially equal to zero.

If the difference (t1−t2) is not equal to zero, the microcontroller 69 will control the driving member 20 to rotate along the direction in which the third travel time t3 decreases until the difference (t1−t2) is substantially equal to zero. For example, when the participant 202 speaks, if the difference (t1−t2) is not equal to zero, the driving member 20 will rotate clockwise in which the third travel time t3 decreases until the difference (t1−t2) is substantially equal to zero. When the participant 208 speaks, if the difference (t1−t2) is not equal to zero, the driving member 20 will rotate counter-clockwise in which the third travel time t3 decreases until the difference (t1−t2) is substantially equal to zero. Therefore, the microphone 70 aims at the active speaker. As a result, the electronic device 100 can automatically track an active speaker during the telephone conference. This is convenient in practice.

Figure 4:
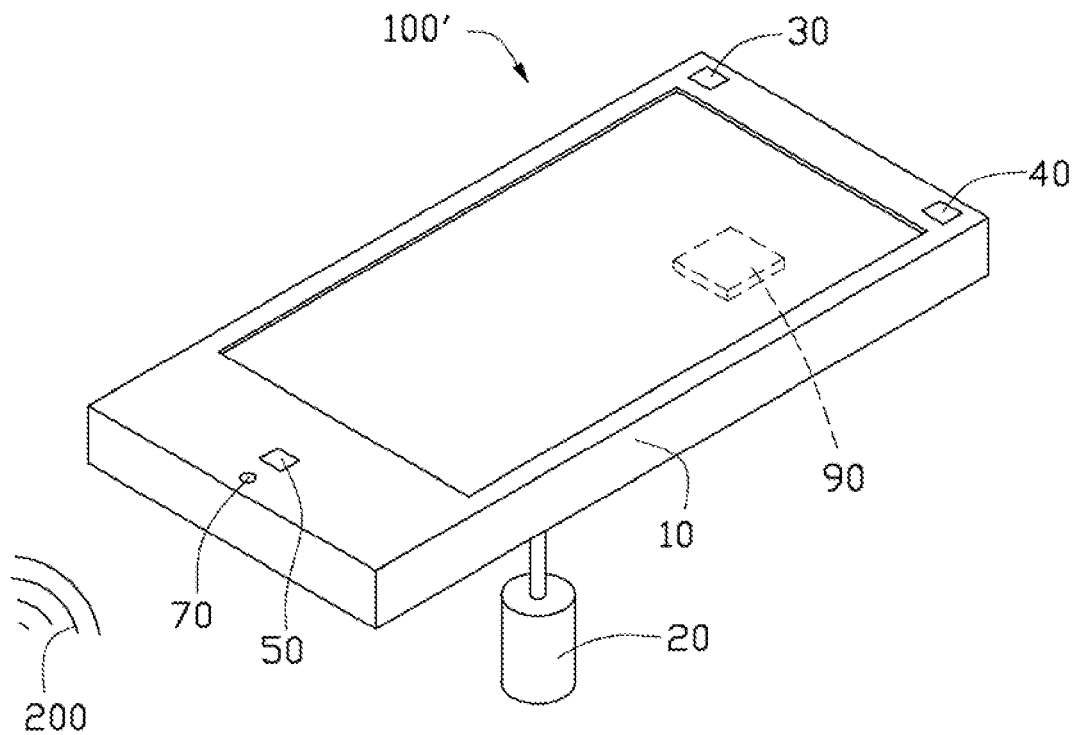
FIG. 4 is an isometric, schematic view of an electronic device, according to a second exemplary embodiment.
Figure 5:
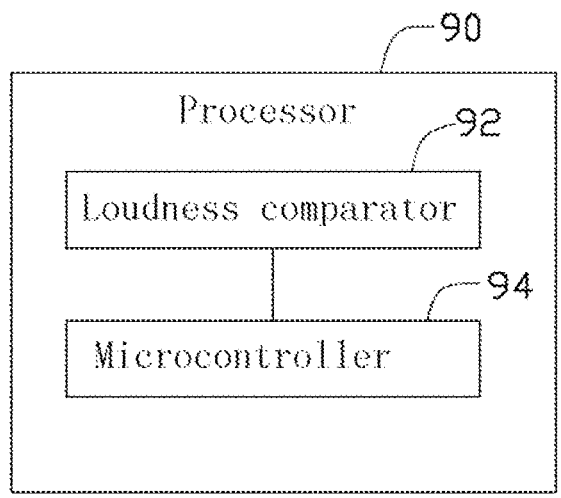
FIG. 5 is a functional block diagram of a processor of the electronic device of FIG. 4.

Referring to FIGS. 4-5, an electronic device 100', according to a second exemplary embodiment, is shown. The differences between the electronic device 100' of the embodiment and the electronic device 100 of the first embodiment are that: the intensity of the sound signal generated by the first sound sensor 30, the second sound sensor 40, or the third sound sensor 50 can be, for example, a loudness e1, e2, and e3 of a sound from the sound source 200 detected by the corresponding sound sensor 30, 40, and 50. In other words, the intensity of the first sound signal is first loudness e1 of the sound from the sound source 200 detected by the first sound sensor 30. The intensity of the second sound signal is second loudness e2 of the sound from the sound source 200 detected by the second sound sensor 40. The intensity of the third sound signal is third loudness e3 of the sound from the sound source 200 detected by the third sound sensor 50.

The processor 90 is configured for analyzing the first loudness e1, the second loudness e2, and the third loudness e3, and controlling the driving member 20 to rotate along a direction in which the third loudness e3 decreases, according to a difference between the first loudness e1 and the second loudness e2, thereby moving the microphone 70 toward the sound source 200. In detail, the processor 90 is embedded in the housing 10 and includes a loudness comparator 92 and a microcontroller 94. The loudness comparator 92 is respectively electrically connected to the three sound sensors 30, 40, and 50. The microcontroller 94 is electrically connected to the loudness comparator 92 and the driving member 20. The loudness comparator 92 is configured for comparing the first loudness e1, the second loudness e2, and the third loudness e3, and calculating the difference between the first loudness e1 and the second loudness e2. The microcontroller 92 is configured for controlling the driving member 20 to rotate along the direction in which the third loudness e3 decreases, according to the loudness difference.

When the electronic device 100' is in operation during a telephone conference, the three sound sensors 30, 40, and 50 generate the three sound signals. The loudness comparator 92 compares the three loudness e1, e2, and e3 and calculates the difference between the first loudness e1 and the second loudness e2. If the difference (e1−e2) is substantially equal to zero and the third loudness e3 satisfies the following formula: e3<e1=e2, the microphone 70 aims at the sound source 200 and the microcontroller 94 will not control the driving member 20 to rotate. If the difference (e1−e2) is substantially equal to zero and the third loudness e3 satisfies the following formula: e3>e1=e2, the microcontroller 94 will control the driving member 20 to rotate along the direction in which the third loudness e3 decreases until the difference (e1−e2) is substantially equal to zero again. If the difference (e1−e2) is not equal to zero, the microcontroller 94 will control the driving member 20 to rotate along the direction in which the third loudness e3 decreases until the difference (e1−e2) is substantially equal to zero again.

The advantages of the electronic device 100' of the second embodiment is similar to those of the electronic device 100 of the first embodiment.

It is to be understood, however, that even though numerous characteristics and advantages of the present embodiments have been set forth in the foregoing description, together with details of the structures and functions of the embodiments. The disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device capable of auto-tracking a sound source, comprising:
   a driving member comprising a rotor;
   a housing fixed to the rotor;
   a first sound sensor positioned on the housing and configured for detecting sound from a sound source to generate a first sound signal associated therewith;
   a second sound sensor positioned on the housing spaced from the first sound sensor and configured for detecting the sound from the sound source to generate a second sound signal associated therewith;
   a third sound sensor positioned on a perpendicular bisector of a connection line of the first sound sensor and the second sound sensor and configured for detecting sound from the sound source to generate a third sound signal associated therewith;
   a microphone positioned on the perpendicular bisector of the connection line of the first sound sensor and the second sound sensor; and
   a processor positioned in the housing and configured for analyzing intensities of the first, second and third sound signals, and controlling the driving member to rotate along a direction in which the intensity of the third sound signal decreases, based on a difference between the intensity of the first sound signal and the intensity of the second sound signal, thereby moving the microphone toward the sound source, wherein the intensity of the first sound signal is representative of a first travel time t1 of the sound from the sound source to the first sound sensor, the intensity of the second sound signal is representative of a second travel time t2 of the sound from the sound source to the second sound sensor, and the intensity of the third sound signal is representative of a third travel time t3 of the sound from the sound source to the third sound sensor, if a travel time difference (t1−t2) between the first travel time t1 and the second travel time t2 is substantially equal to zero and the third travel time t3 satisfies the following formula: t3>t1=t2, the processor is configured for controlling the driving member to rotate along the direction in which the third travel time t3 decreases until the travel time difference (t1−t2) is substantially equal to zero; and if the travel time difference (t1−t2) is not substantially equal to zero, the processor is configured for controlling the driving member to rotate along the direction in which the third travel time t3 decreases until the travel time difference (t1−t2) is substantially equal to zero.

2. The electronic device as claimed in claim 1, wherein the housing comprises a first surface and an opposing second surface, a screen is formed on the first surface, and the rotor is fixed to the second surface.

3. The electronic device as claimed in claim 2, wherein the housing comprises a first end and a second end opposite to the first end, the first sound sensor and the second sound sensor are positioned on the first surface at the first end, and the third sound sensor and the microphone are positioned on the first surface at the second end.

4. The electronic device as claimed in claim 1, wherein the processor comprises three triggers electrically connected to the first, second, and third sound sensors respectively, a time comparator electrically connected to the three triggers, and a microcontroller electrically connected to the time comparator and the driving member, each of the triggers is configured for outputting a pulse signal to the time comparator in response to the corresponding first, second or third sound signal, the time comparator is configured for comparing the travel time from the sound source to the three sound sensors and calculating the travel time difference (t1−t2), and the microcontroller is configured for controlling the driving member to rotate along the direction in which the third travel time t3 decreases, according to the travel time difference (t1−t2).

5. An electronic device capable of auto-tracking a sound source, comprising:
   a driving member comprising a rotor;
   a housing fixed to the rotor;
   a first sound sensor positioned on the housing and configured for detecting sound from a sound source to generate a first sound signal associated therewith;
   a second sound sensor positioned on the housing spaced from the first sound sensor and configured for detecting the sound from the sound source to generate a second sound signal associated therewith;
   a third sound sensor positioned on a perpendicular bisector of a connection line of the first sound sensor and the second sound sensor and configured for detecting sound from the sound source to generate a third sound signal associated therewith;
   a microphone positioned on the perpendicular bisector of the connection line of the first sound sensor and the second sound sensor; and
   a processor positioned in the housing and configured for analyzing intensities of the first, second and third sound signals, and controlling the driving member to rotate along a direction in which the intensity of the third sound signal decreases, based on a difference between the intensity of the first sound signal and the intensity of the second sound signal, thereby moving the microphone toward the sound source, wherein the intensity of the first sound signal is representative of a first loudness e1 of the sound detected by the first sound sensor, the intensity of the second sound signal is representative of a second loudness e2 of the sound detected by the second sound sensor, and the intensity of the third sound signal is representative of a third loudness e3 of the sound detected by the third sound sensor, if a loudness difference (e1−e2) between the first loudness e1 and the second loudness e2 is substantially equal to zero and the third loudness e3 satisfies the following formula: e3>e1=e2, the processor is configured for controlling the driving member to rotate along the direction in which the third loudness e3 decreases until the loudness difference (e1−e2) is substantially equal to zero; and if the loudness difference (e1−e2) is not substantially equal to zero, the processor is configured for controlling the driving member to rotate along the direction in which the third loudness e3 decreases until the loudness difference (e1−e2) is substantially equal to zero.

6. The electronic device as claimed in claim 5, wherein the housing comprises a first surface and an opposing second surface, a screen is formed on the first surface, and the rotor is fixed to the second surface.

7. The electronic device as claimed in claim 6, wherein the housing comprises a first end and a second end opposite to the first end, the first sound sensor and the second sound sensor are positioned on the first surface at the first end, and the third sound sensor and the microphone are positioned on the first surface at the second end.

8. The electronic device as claimed in claim 5, wherein the processor comprises a loudness comparator, and a microcontroller electrically connected to the loudness comparator and the driving member, the loudness comparator is configured for comparing the loudness of the sound detected by the three sound sensors and calculating the loudness difference (e1−e2), and the microcontroller is configured for controlling the driving member to rotate along the direction in which the third loudness e3 decreases, according to the loudness difference (e1−e2).

\* \* \* \* \*